(12) United States Patent
Pavlovic et al.

(10) Patent No.: US 11,651,868 B1
(45) Date of Patent: May 16, 2023

(54) FORMULATION FOR A STABLE ELECTRICALLY CONDUCTIVE POLYMER

(71) Applicant: Global Inventive Consulting Inc., Etobicoke (CA)

(72) Inventors: Slobodan Pavlovic, Etobicoke (CA); Mohamad Zeidan, Bloomfield Hills, MI (US)

(73) Assignee: Global Inventive Consulting Inc., Etobicoke (CA)

( * ) Notice: Subject to any disclaimer, the term of this patent is extended or adjusted under 35 U.S.C. 154(b) by 0 days.

(21) Appl. No.: 17/584,819

(22) Filed: Jan. 26, 2022

(51) Int. Cl.
*H01B 1/20* (2006.01)
*H01B 1/22* (2006.01)
*H01B 1/02* (2006.01)
*C08K 9/02* (2006.01)

(52) U.S. Cl.
CPC ............... *H01B 1/02* (2013.01); *C08K 9/02* (2013.01); *C08K 2201/001* (2013.01); *H01B 1/20* (2013.01); *H01B 1/22* (2013.01)

(58) Field of Classification Search
None
See application file for complete search history.

(56) References Cited

U.S. PATENT DOCUMENTS

| | | | | |
|---|---|---|---|---|
| 5,111,178 A | * | 5/1992 | Bosze | H01C 10/306 338/226 |
| 2003/0111647 A1 | * | 6/2003 | Rosenzweig | B29C 45/0013 252/500 |
| 2006/0131547 A1 | * | 6/2006 | Aisenbrey | B29B 15/122 252/511 |

FOREIGN PATENT DOCUMENTS

| | | | |
|---|---|---|---|
| JP | 2001261975 | * | 9/2001 |
| RU | 2677160 | * | 1/2019 |

* cited by examiner

*Primary Examiner* — Tanisha Diggs
(74) *Attorney, Agent, or Firm* — Heed Law Group PLLC; Thomas P. Heed

(57) ABSTRACT

The present invention is an electrically conductive polymer that is stable with respect to both time and environmental conditions. Most electrically conductive polymers have bulk resistance that varies (increases) over time. The current electrically conductive polymers also vary when they are exposed to harsh environments. The time and environmental variability is attributable to both the type of fiber and the type of coating used. The present invention uses stainless steel fibers that have an outer most coating that is one of tin, tin-lead, tin-silver, tin-palladium, tin-silver-palladium, and silver-palladium. The coating comprises 5%-40%, by weight, of the coating fiber. The coated fiber comprises 25%-35%, by weight, of the electrically conductive polymer. The bulk polymer is at least one of polypropylene ("PP"), polycarbonate ("PC"), acrylonitrile butadiene styrene ("ABS"), polyethylene ("PE"), polyether ether ketone ("PEEK"), and polyethylene terephthalate ("PET").

14 Claims, 10 Drawing Sheets

FORMULATION FOR A STABLE ELECTRICALLY CONDUCTIVE POLYMER

FIELD OF INVENTION

This invention relates to the classification of conductive bodies characterized by the conductive materials, and to one or more sub-classifications for conductive material dispersed in non-conductive organic material. Specifically, this invention is a formulation for a stable electrically conductive polymer; formulation which exhibits constant resistivity over both time and temperature.

BACKGROUND OF INVENTION

Electrically conductive polymers have been around for decades. However, despite initial expectations that they would revolutionize electronics and displace traditional conductors in a variety of applications, the market for electrically conductive polymers has remained relatively small when compared to the overall polymer and electronics markets.

The reason for this is that current electrically conductive polymers do not possess immutable electrical characteristics. Specifically, it has been widely observed that resistivity varies over time for the current generations of electrically conductive polymers. Additionally, the resistivity varies more significantly for demanding environmental applications such as automotive and aerospace. This has been observed both in the field and in accelerated environmental tests that are commonly used in the automotive industry, such as salt spray tests, thermal and humidity cycling tests, and other aging tests. In these accelerated environmental tests, the resistivity of the current generations of electrically conductive polymers increases as a function of both time and the change in temperature and humidity. In other words, the volumetric resistivity of an electrically conductive polymer goes up over both time and gradients of temperature and humidity. Electrically conductive metals such as copper and aluminum have nearly constant volumetric resistivity before and after the same tests.

For electrically conductive polymers to reach their true potential, a formulation must be found that has constant volumetric resistivity over time and after exposure to the elements.

SUMMARY OF THE INVENTION

This summary is intended to disclose the present invention, a formulation for a stable electrically conductive polymers, which has constant resistivity over time and environmental conditioning. The embodiments and descriptions are used to illustrate the invention and its utility and are not intended to limit the invention or its use. In the illustrated embodiments, examples of products using the formulation for a stable electrically conductive polymer are used in order to disclose and teach the scope of the invention. The invention is not limited to the actual products shown. The formulation for a stable electrically conductive polymer can be used in a wide variety of applications, including, but not limited to, electrical connectors, non-electrical connectors, electrical shielding, bipolar battery plates, wiring harnesses, and power distribution.

Electrically conductive polymers are a mixture of one or more polymers and conductive particles. The particles are typically fibers. The purpose of the particles is to load the electrically conductive polymer so that it can hold a charge. Loading, as used in this application, means the physical structures that actually are capable of transmitting an electric potential or electric charge, as the case may be. When fibers are used for loading, they are most commonly metal-plated carbon fibers. The metal-plated carbon fibers are generally plated with nickel, copper, or a combination of both.

The initial volume resistivity of a product made from an electrically conductive polymer is a function of the conductivity of the individual fibers and the percentage of their loading in the finished product. Products are usually fabricated with a molding process, such as injection molding. The electrically conductive polymer is usually fed into a molding process as a pellet.

Electrical performance of the product made from electrically conductive polymers is a function of the volume resistivity. The volume resistivity of the current generations of electrically conductive polymers are not constant over time. Rather, the volume resistivity of the current generations of electrically conductive polymers increases over time. The volume resistivity of the current generations of electrically conductive polymers also increases with repeated exposure to large temperature and humidity gradients. The slowly increasing volume resistivity significantly limits the applications into which the current generations of electrically conductive polymers can be placed.

To understand what is going on, it is necessary to look at the microscopic make-up of the material. The volume resistivity of a conductor made from electrically conductive polymers is the result of the electrical performance of the fiber mesh created within the wall of the conductor when it was fabricated. This mesh is really an electrical circuit made from millions of short fibers connected with each other through mechanical interfaces. The mechanical interfaces are electro-mechanical contacts between the individual fibers. The fibers are not bound to each other, electrically. The fibers have not been soldered together. The bulk polymer holds the fibers together.

The electrically conductive fiber mesh can be modelled as a network of series and parallel resistors. The overall resistance of such conductors is presented as the sum of the bulk resistances of all fibers in the mesh and the sum of the resistances of all electrical contacts between individual fibers in the mesh: $R=\Sigma r_B+\Sigma r_C$, where R is the overall resistance of the electrically conductive polymer, $r_B$ is the bulk resistance of a fiber and rc is the resistance of an electrical contact. As a naming convention, the capital R will stand for the overall resistance of the conductor while the lower-case r will stand for the resistance of the individual constituents.

Electrical resistance of each individual contact between conductive fibers is defined as $r_{ci}$ (resistance of $i^{th}$ contact between two fibers). All individual contact resistances are assumed to be equal to each other resulting in cumulative resistance of all (n) fiber contacts to be $r_C=nr_{ci}$. The cumulative bulk resistance of the fiber mesh is represented in this model as m parallel resistors each made from k individual fibers connected together via zero resistance contacts. The k individual fibers will be considered a miniature string. Each individual fiber in the miniature string has same bulk resistance leading to $r_{bstring}=kr_{bfibers}$. The cumulative resistance of m parallel mesh strings is $r_B=r_{bstring}/m$. Cumulative resistance of the conductor made from electrically conductive polymer is sum of Bulk fiber resistance and the sum of the fiber contact resistance, thus $R=\Sigma r_B+\Sigma r_C=\Sigma r_{bstring}/m+\Sigma nr_{ci}$.

Based on properties of the fiber materials and fiber plating materials it is obvious that bulk resistance is not impacted by environments and that volume resistivity of these materials stays constant. Change of volume resistivity of the conductor made from electrically conductive polymers because of time and environmental impact is caused by changes of the contact resistance between individual fibers, only.

The volume resistivity of a conductor made from current generations of electrically conductive polymers increases over time due to increases in the resistance of the individual electrical contact between fibers in the conductive mesh. This problem can only be fixed by creating contact surfaces between the individual fibers having resistances which do not vary over time or with environmental cycling.

In the current generations of electrically conductive polymers, the most frequently used fibers are nickel-plated carbon fibers and copper-plated carbon fibers. In some special applications, carbon fibers plated first with nickel then with copper are also used. Nickel and carbon fiber are rigid, and therefore do not necessarily create the best electromechanical contacts. Nickel and copper both have a tendency to have high surface resistance, also. The high surface resistance is caused by oxidation, sulfidation, contamination, or a combination of all three. Environmental cycling would tend to raise the surface resistance in the presence of oxidation, sulfidation, and contamination.

The present invention fixes the problem of high surface resistance for the contacts of the fiber by using stainless steel fibers with an outmost coating of tin, tin-lead, tin-silver, tin-palladium, tin-silver-palladium, or silver-palladium. Tin, silver, and palladium are soft materials with low resistance oxides. They conform easily to make an electro-mechanical contact.

Experimentation has demonstrated that coating stainless steel with at least one of tin, silver, and palladium as the outmost coating yields a bulk resistance that does not vary with time or environmental conditions. Additionally, using an outmost coating of at least one of tin, silver, and palladium with nickel-plated stainless-steel fibers and copper-plated stainless-steel fibers also yields an electrically conductive polymer in which the bulk resistance does not vary with time. The invention can also be fabricated as a stainless-steel fiber plated with both nickel and copper, which receives an outermost coating of at least one of tin, silver, and palladium.

The outmost coating of at least one of tin, silver, and palladium can be done using electroplating, electroless plating, or other suitable coating process.

Austenitic stainless steel is the preferred formulation of stainless steel. The invention also works with martensitic stainless steel, duplex stainless steel, precipitation hardened stainless steel, and ferritic stainless steels.

The coating can be between 5% and 40%, by weight, for the fibers. In other words, between 5% and 40% of the weight of the fibers is made up of the coating. Coating done with only tin, tin-silver, and tin-palladium are at the lower end of the spectrum, near 5% by weight (stainless steel accounting for 95% of the weight and the coating accounting for 5% of the weight). Coating with nickel and then overcoating with tin-lead is towards the upper end of the spectrum at nearly 40% by weight.

To achieve proper dispersion, the coated fibers should account for approximately 30%, by weight of the overall conductive polymer. The low end of the range is 25%. The high end of the range is 35%. This overcomes injection molding process variation and ensures that there is proper dispersion of the fibers.

Electrically conductive polymers are useful when their internal fiber mat creates a Faraday Cage. The Faraday Cage prevents electromagnetic signals from passing through the structure. If lesser amounts of fiber are used in a formulation, bundling, tending toward clumping, occurs. When using a low percentage, by weight, of fibers, clumping can impair the homogeneity of the Faraday Cage formed by the fibers, and therefore, performance.

BRIEF DESCRIPTION OF THE DRAWINGS

The present invention is illustrated with 11 drawings on 10 sheets.

DETAILED DESCRIPTION OF THE DRAWINGS

The following descriptions are not meant to limit the invention, but rather to add to the summary of invention, and disclose the present invention, by offering and illustrating various embodiments of the present invention, a formulation for a stable electrically conductive polymer. While embodiments of the invention are illustrated and described, the embodiments herein do not represent all possible forms of the invention. Rather, the descriptions, illustrations, and embodiments are intended to teach and inform one skilled in the art without limiting the scope of the invention.

Figure 1:
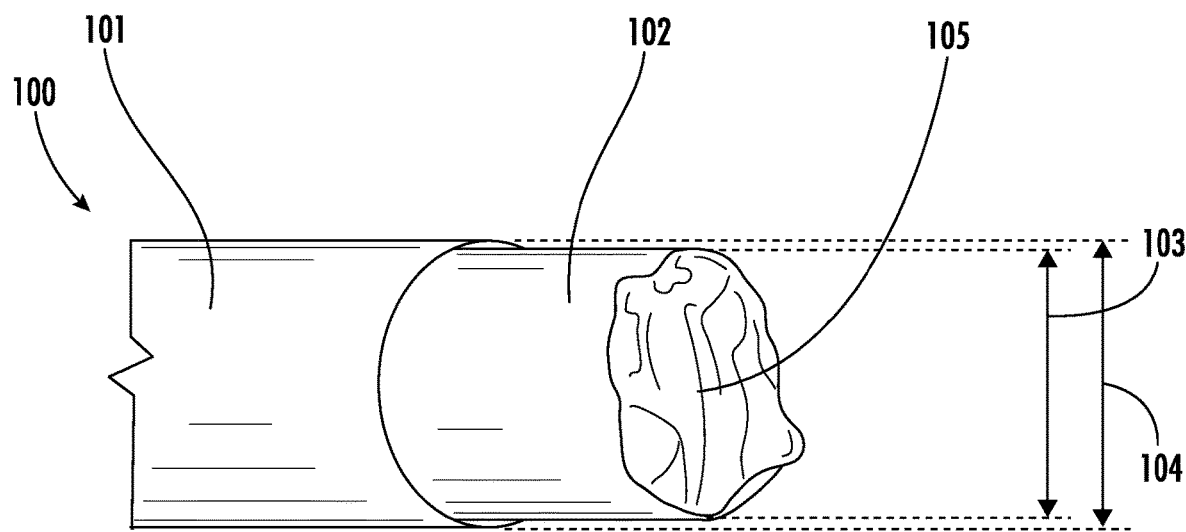
FIG. 1 is a magnified perspective cross-section of a single coated stainless-steel fiber used in the formulation for a stable electrically conductive polymer.

Traditional electrically conductive polymers are comprised of a large plurality of conductive fibers dispersed in a bulk polymer. Likewise, the present invention is comprised of a large plurality of conductive stainless-steel fibers dispersed in a bulk polymer. FIG. 1 shows a single coated stainless-steel fiber 100. The single coated fiber 100 is comprised of a raw stainless-steel fiber 105 and a coating 101. The stainless-steel fiber 105 material of the present invention is austenitic stainless steel, although other families of stainless steel also work. The stainless-steel fiber 105 has a stainless-steel interior 105 and an outer surface 201. The stainless-steel fiber 105 has an outer diameter 103.

The coating 101 has an outer diameter 104. The coating 101 has an outermost layer of tin, tin-lead, tin-silver, tin-palladium, tin-silver-palladium, or silver-palladium. Tin, silver, and palladium are soft materials with low resistance oxides. They conform easily to make an electro-mechanical contact. The coating 101 is between 5% and 40%, by weight, for the fibers 100. In other words, between 5% and 40% of the weight of the fibers 100 is made up of the coating 101. Coating 101 done with only tin, tin-silver, and tin-palladium are at the lower end of the spectrum, near 5% by weight (the stainless-steel fiber 105 accounting for 95% of the weight and the coating 101 accounting for 5% of the weight). Coating 101 with nickel and then over-coating with tin-lead is towards the upper end of the spectrum at nearly 40% by weight.

Figure 3:
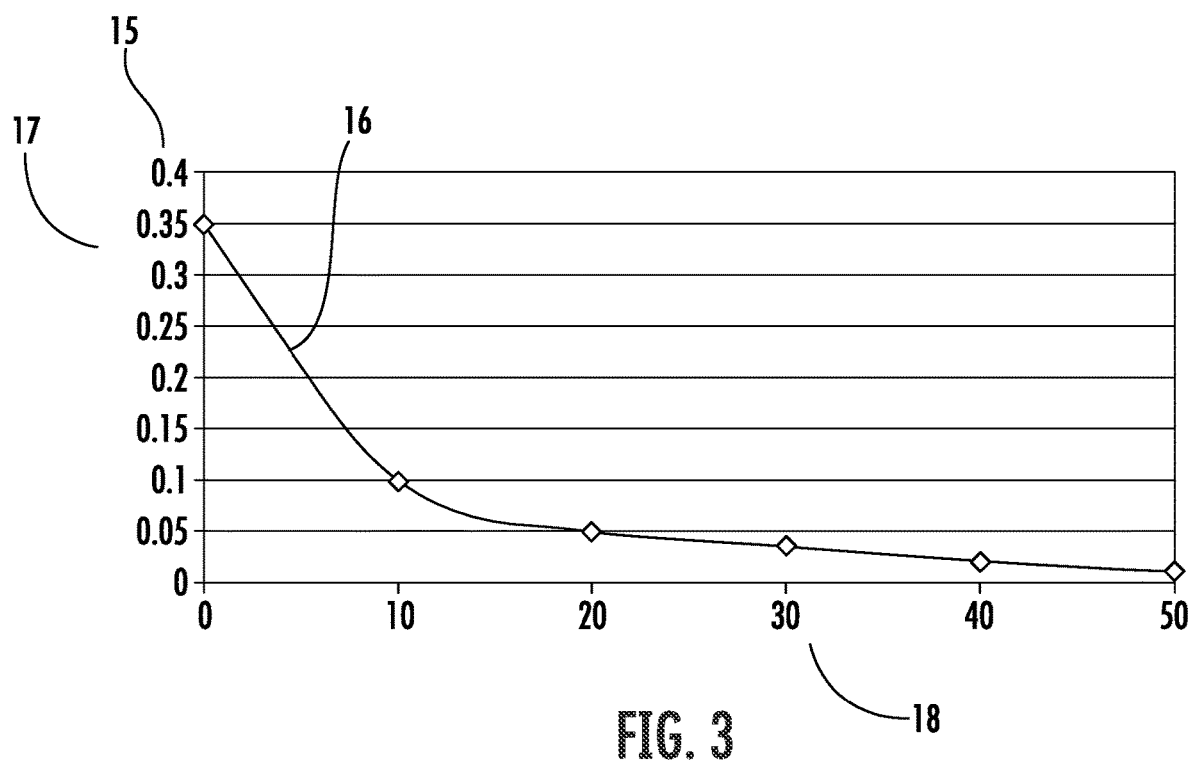
FIG. 3 is a graph of the bulk resistance of a representative electrically conductive polymer.

The coating 101 of the coated fiber 100 is necessary in order to achieve sufficient conductivity within the bulk polymer. FIG. 3 is a graph 17 showing the bulk resistance for the present invention. The resistance per unit length is on the y-axis 15 and the percentage of overall weight attributable to the coating is on the x-axis 18. The resistance per unit length 15 falls 16 as the percentage of coating 18 rises. This relationship holds true regardless of the type of stainless-steel fiber (e.g., austenitic and martensitic) and the type of coating (e.g., copper, nickel, and tin).

Figure 2:
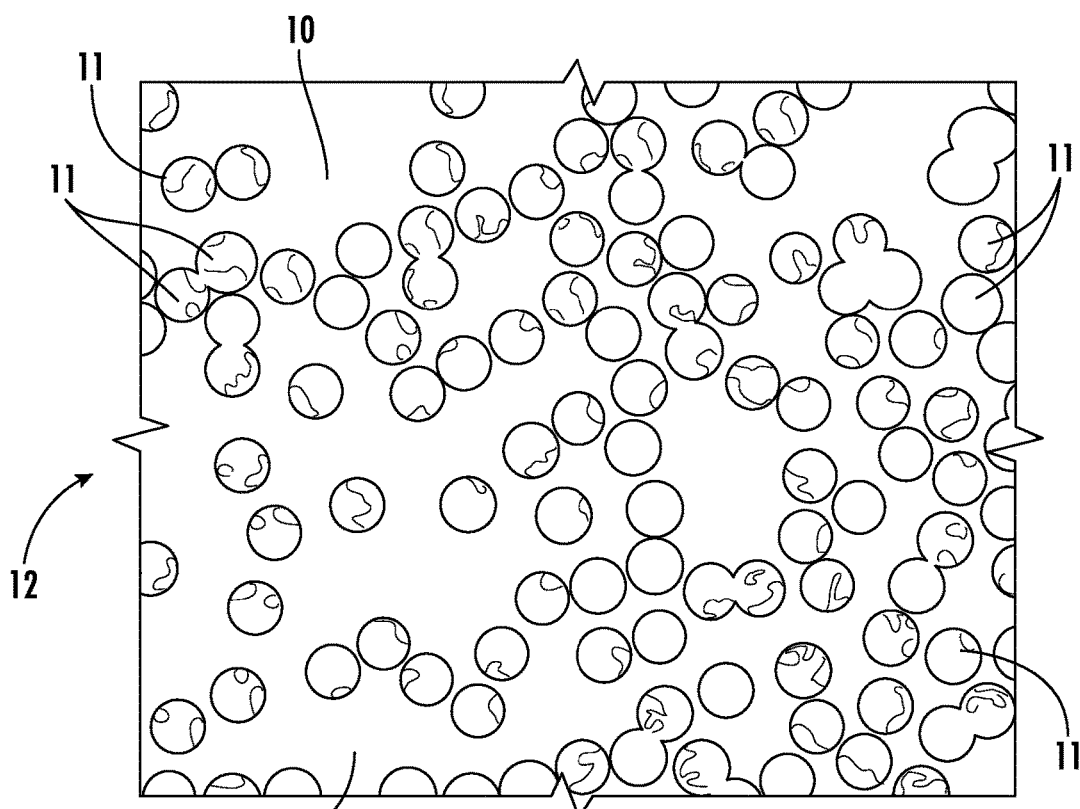
FIG. 2 is a cross-section through the bulk of the formulation for a stable electrically conductive polymer showing that the fibers have a common orientation.

Referring now, also, to FIG. 2, a cross-section of a the formulation for a stable electrically conductive polymer 12. The formulation for a stable electrically conductive polymer 12 is comprised of coated stainless-steel fibers 11, 100 in a bulk polymer 10. The bulk polymer 10 can be any commercially viable polymer. The formulation for a stable electrically conductive polymer 12 can be made with most commonly used bulk polymers 10 such as polypropylene ("PP"), polycarbonate ("PC"), acrylonitrile butadiene styrene ("ABS"), polyethylene ("PE"), polyether ether ketone ("PEEK"), and polyethylene terephthalate ("PET"). These polymers are all attractive due to their cost, physical characteristics, and wide-spread acceptance. The cross-sections 11 of the fibers 100 is apparent in FIG. 2, as the fibers in an electrically conductive polymer 12 will typically possess the same orientation.

Figure 4:
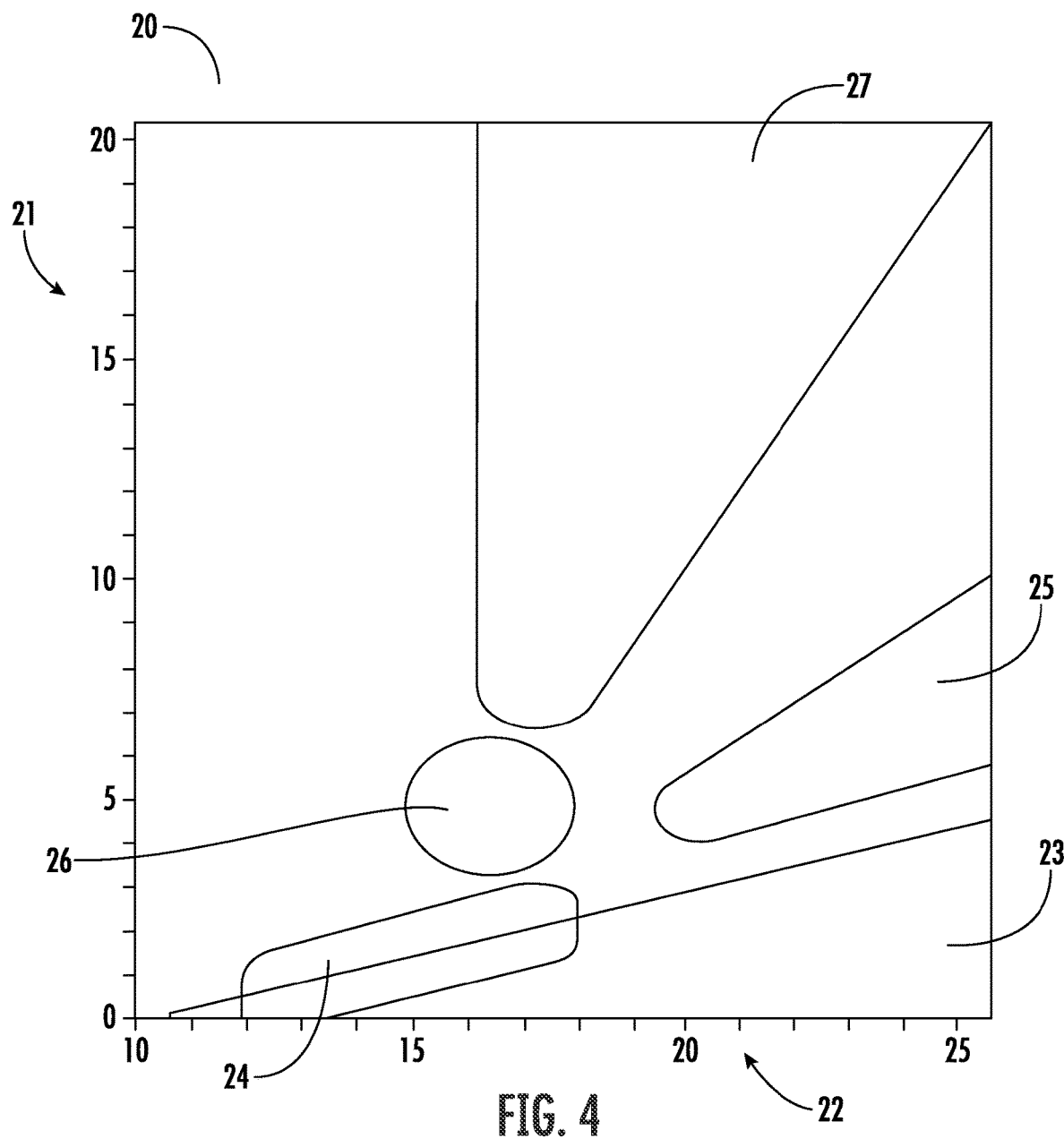
FIG. 4 is a graph showing the various families of stainless steel as a percentage of nickel and chromium.

FIG. 4 shows a chart 20 with the primary families of stainless steel: austenitic 27, duplex 25, ferritic 23, martensitic 24, and precipitation hardened 26. The families of stainless steel 27, 25, 23, 24, 26 are defined by their percentage of nickel 21 versus their percentage of chromium 22. Austenitic stainless steel 27 has between 16% and 25% chromium by weight; and between 7% and 20% nickel by weight. Although the stainless-steel fiber 105 of the present invention 12 can be fabricated with any stainless steel 27, 25, 23, 24, 26, austenitic 27 stainless steel has advantages in terms of ease of injection molding and dispersion.

Figure 10A:
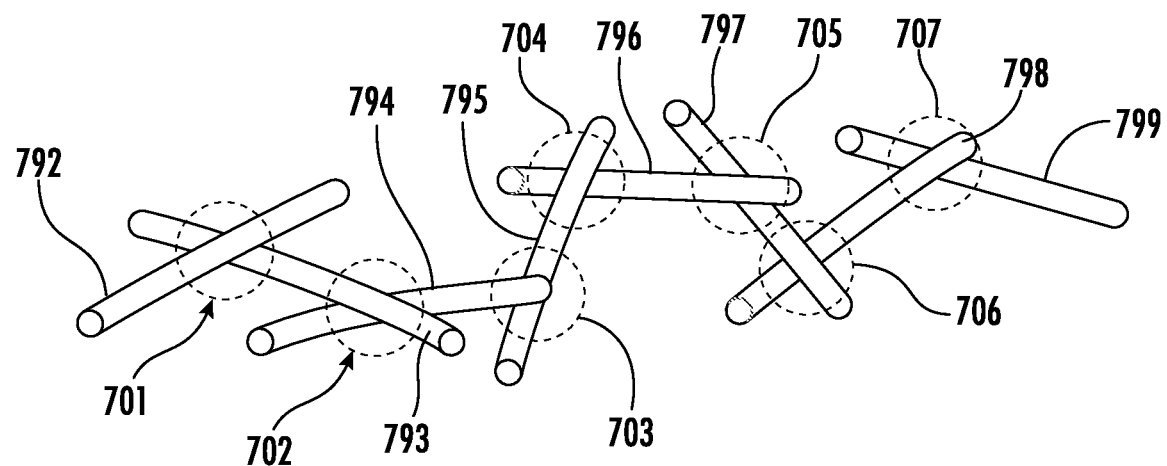
FIG. 10A is a diagram showing a chain of fibers and electro-mechanical contacts.

FIG. 10A is a simplified diagram showing a plurality of coated stainless-steel fibers 792, 793, 794, 795, 796, 797, 798, 799. The plurality of coated stainless-steel fibers 792, 793, 794, 795, 796, 797, 798, 799 make a plurality of electro-mechanical contacts 701, 702, 703, 704, 705, 706, 707.

Figure 10B:
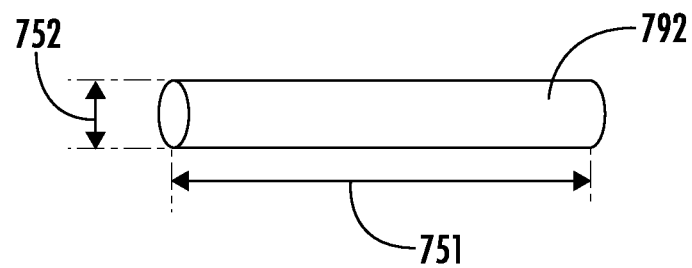
FIG. 10B is a diagram showing the length and width of a fiber.

FIG. 10B shows is a close-up of one of the stainless-steel fibers 792, showing its length 751 and diameter 752. The resistance of the stainless-steel fiber 792 is given by the standard formula:

$$r_{792} = \frac{\rho l}{A},$$

where $\rho$ is resistivity of stainless steel, l is the length 751 of the fiber 792, and A is the cross-sectional area of the fiber, which is $\pi d$, where d is the diameter 751. All of the plurality of coated fibers 792, 793, 794, 795, 796, 797, 798, 799 are assumed to have the same resistance. Therefore, the resistance of the eight fiber-long string 792, 793, 794, 795, 796, 797, 798, 799 is given by $r_{bstring}=kr_{bfibers}=8*r_{792}$. Again, cumulative resistance of the conductor made from electrically conductive polymer is the sum of bulk fiber resistance and fibers contact resistance, thus $R=\Sigma r_B+\Sigma r_C=\Sigma r_{bstring}/\text{m}+\Sigma nr_{ci}$. The important part, here, is that the quantity $$r_{792} = \frac{\rho l}{A}$$

does not vary with time or environmental condition. Any change in overall resistance, $R=\Sigma r_B+\Sigma r_c=\Sigma r_{bstring}/\text{m}+nr_{ci}$ is not caused by the resistance of the stainless-steel fibers 792, 793, 794, 795, 796, 797, 798, 799, it is caused by change in the electro-mechanical contact 701, 702, 703, 704, 705, 706, 707.

The present invention improves on the prior art and solves the problem with time- and environmentally-caused change in bulk resistance in the current generations of electrically conductive polymers. The coating 101 has an outermost layer of tin, tin-lead, tin-silver, tin-palladium, tin-silver-palladium, or silver-palladium, which is mechanically soft and which is far superior to nickel and copper with respect to oxidation, sulfidation, and contamination.

In the current generations of electrically conductive polymers, the most frequently used fibers are nickel-plated carbon fibers and copper-plated carbon fibers. In some special applications, carbon fibers are plated first with nickel then with copper, although this clearly add cost. Nickel- or carbon-plated carbon fibers are externally rigid, and therefore do not necessarily create the best electro-mechanical contacts. It is important to note that the electrically conductive polymer coatings of the current generations of electrically conductive polymers do not melt and bond. They are merely held together in the bulk polymer 10 as an electro-mechanical contact. Nickel and copper both have high surface resistance, also. The high surface resistance is a material attribute which is exacerbated by oxidation, sulfidation, and/or contamination. Environmental cycling also tends to raise the surface resistance in the presence of oxidation, sulfidation, and contamination.

The inventors of the current generations of electrically conductive polymers were concerned with thermal expansion within the bulk polymer 10. Carbon fibers have a very low coefficient of thermal expansion. Copper- and nickel-plating have lower coefficients of thermal expansion than tin. Table 1 shows the relative coefficients of thermal expansion, a, in SI units of ($\mu$m/m–C°):

TABLE 1

Coefficient of Thermal Expansion (a)

| Material | Coefficient of Thermal Expansion (a) |
| --- | --- |
| Carbon Fiber | ~1 |
| Nickel | 13 |
| Copper | 16-16.7 |

TABLE 1-continued

Coefficient of Thermal Expansion (a)

| Material | Coefficient of Thermal Expansion (a) |
| --- | --- |
| Austenitic Stainless Steel | 14-17 |
| Tin | 20-23 |
| Lead-Tin Solder | 25 |

But the issue of thermal expansion within the bulk polymer 10 was not the real issue. Surface resistance and its reaction to oxidation, sulfidation, and contamination of the electro-mechanical contacts 701, 702, 703, 704, 705, 706, 707 within the bulk polymer 10 was the issue.

The present invention fixes the problem of high surface resistance for the contacts of the fiber by using stainless steel fibers with an outmost coating of tin, tin-lead, tin-silver, tin-palladium, tin-silver-palladium, or silver-palladium. Tin, silver, and palladium are soft materials with low resistance oxides. They conform easily to make an electro-mechanical contact. By using a coating 101 of tin, tin-lead, tin-silver, tin-palladium, tin-silver-palladium, or silver-palladium over an austenitic stainless-steel fiber 105, the present invention was able to provide constant bulk resistance over both time and environmental exposure. The surface resistance of a coating 101 of tin, tin-lead, tin-silver, tin-palladium, tin-silver-palladium, or silver-palladium is relatively impervious to oxidation, sulfidation, and contamination.

Electrically conductive polymers 12 are useful when their internal fiber mat creates a Faraday Cage. The Faraday Cage prevents electromagnetic signals from passing through the structure. If lesser amounts of fiber 100 are used in a formulation, bundling, tending toward clumping, occurs. When using a low percentage, by weight, of fibers, clumping can impair the homogeneity of the Faraday Cage formed by the fibers 100, and therefore, performance.

To get proper dispersion of the austenitic 27 stainless steel coated fiber 11 in the bulk polymer 10, the coated fiber 11 should be 30% by weight of the total electrically conductive polymer 12. In order to achieve proper dispersion and electrical conductivity, the coated fiber 11 should be no less than 25% by weight of the total electrically conductive polymer 12 and no more than 35% by weight.

Figure 5:
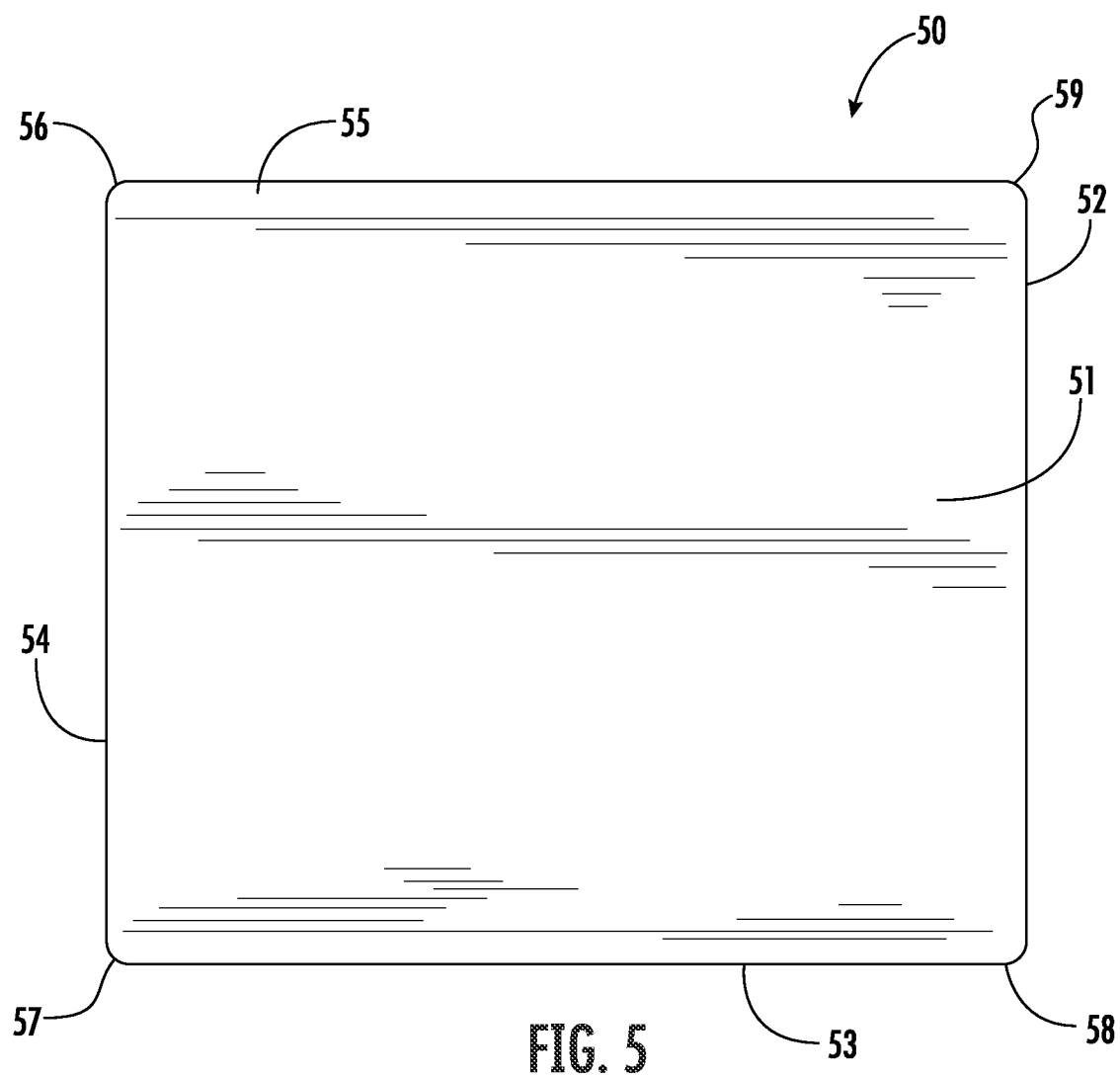
FIG. 5 is a front view of a plaque for testing electrically conductive polymers.

The proper dispersion was arrived at experimentally. FIG. 5 shows a test plaque 50. The electrically conductive polymer 12 was formed into plaques 50. Each plaque 50 had four 6″ sides 53, 52, 55, 54. For ease of handling, the test plaque 50 had rounded corners 59, 58, 57, 56. The surface 51 of the test plaque 50 was exposed electrically conductive polymer 12.

Figure 6A:
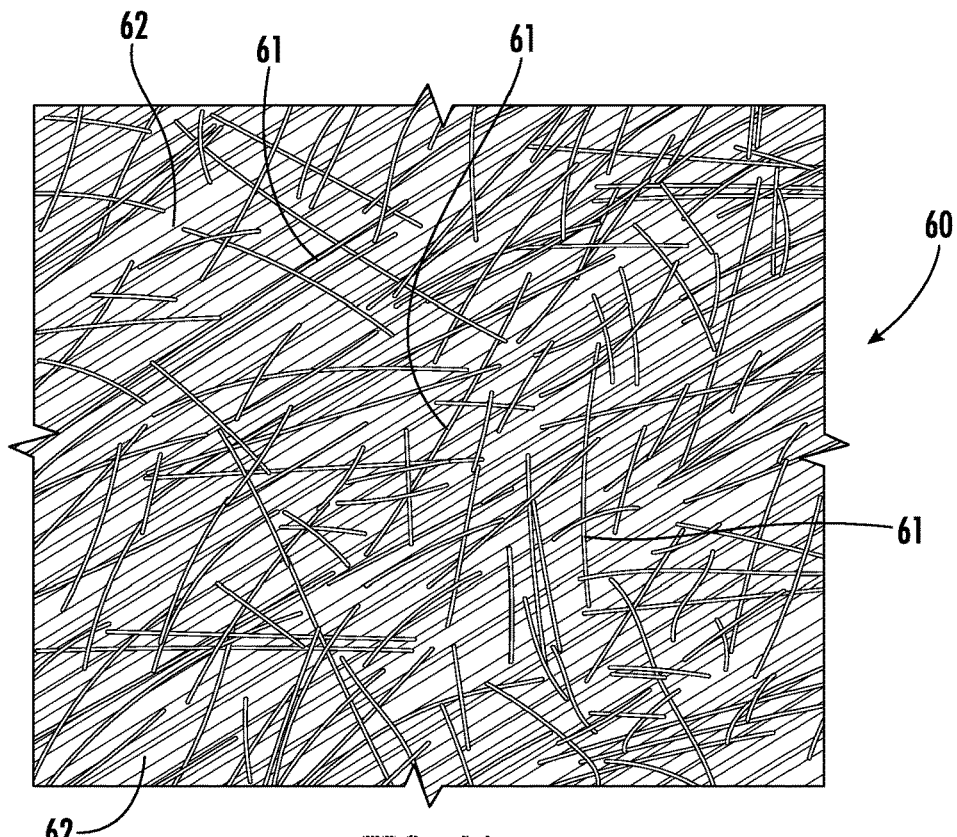
FIG. 6A is a 100× magnification of a test plaque showing the bulk material and stainless-steel fibers.
Figure 6B:
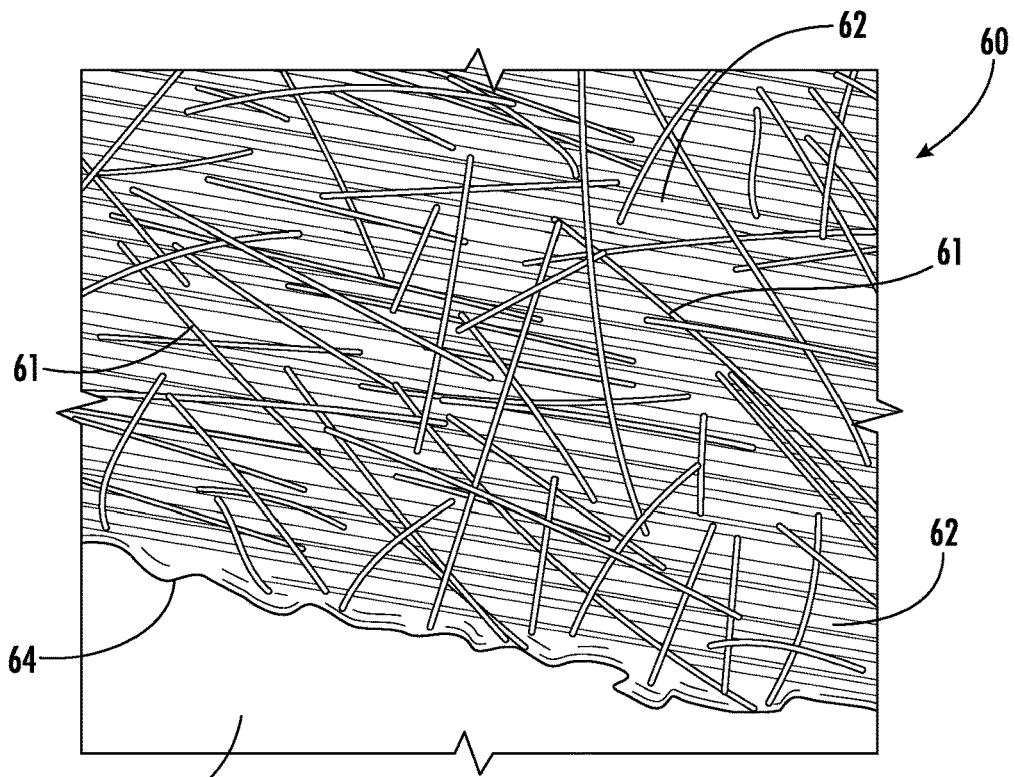
FIG. 6B is a 100× magnification of a test plaque showing the edge of the test plaque, along with the bulk material and stainless-steel fibers.

FIG. 6A and 6B are images of a 100× magnification of the test plaque 60 constructed from ABS as the bulk polymer 62 with fibers 61 fabricated from austenitic stainless steel 27, which were first plated with nickel and copper, and then were plated with lead-tin. At 30% by weight of the total electrically conductive polymer 12, the fibers 61 are properly dispersed across the bulk ABS 12, even at the edge 64. FIG. 6B shows the lower left corner 57 of a test plaque 50, with the plaque 60 magnified 100× and the air 63.

Figure 7A:
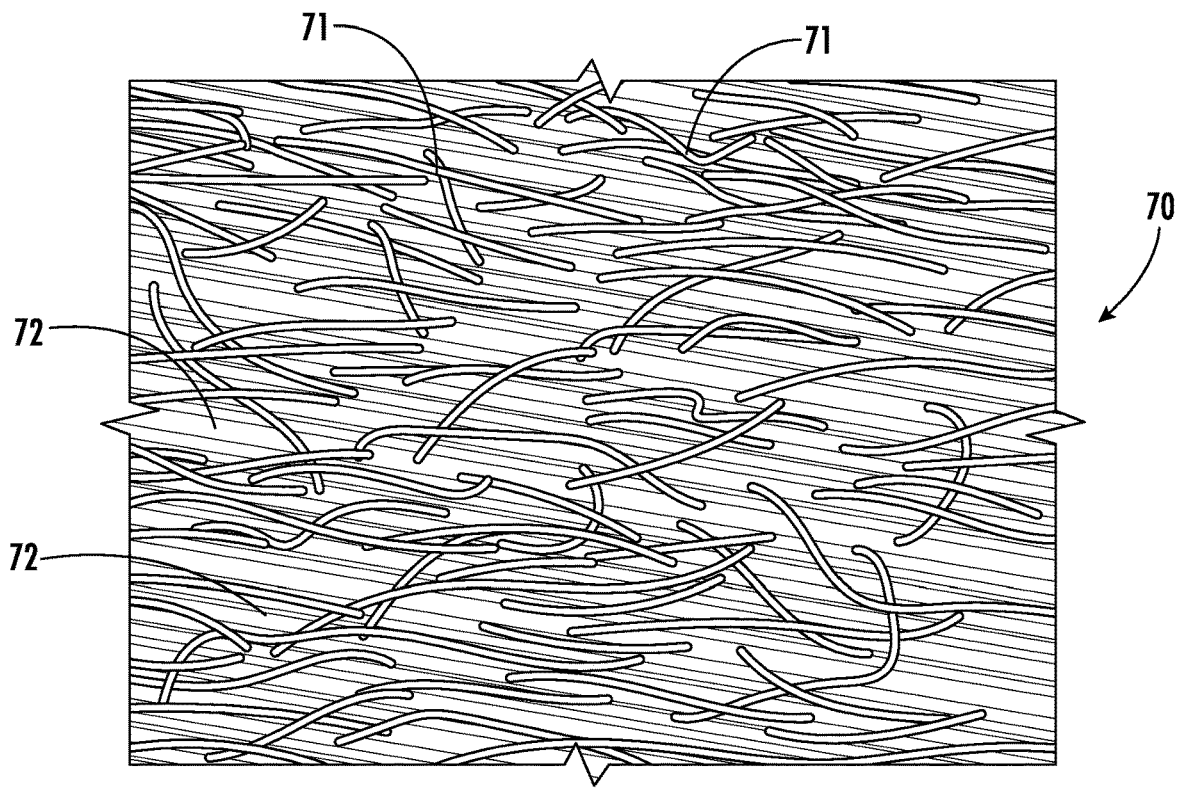
FIG. 7A is a 100× magnification of a test plaque showing the bulk material and stainless-steel fibers.
Figure 7B:
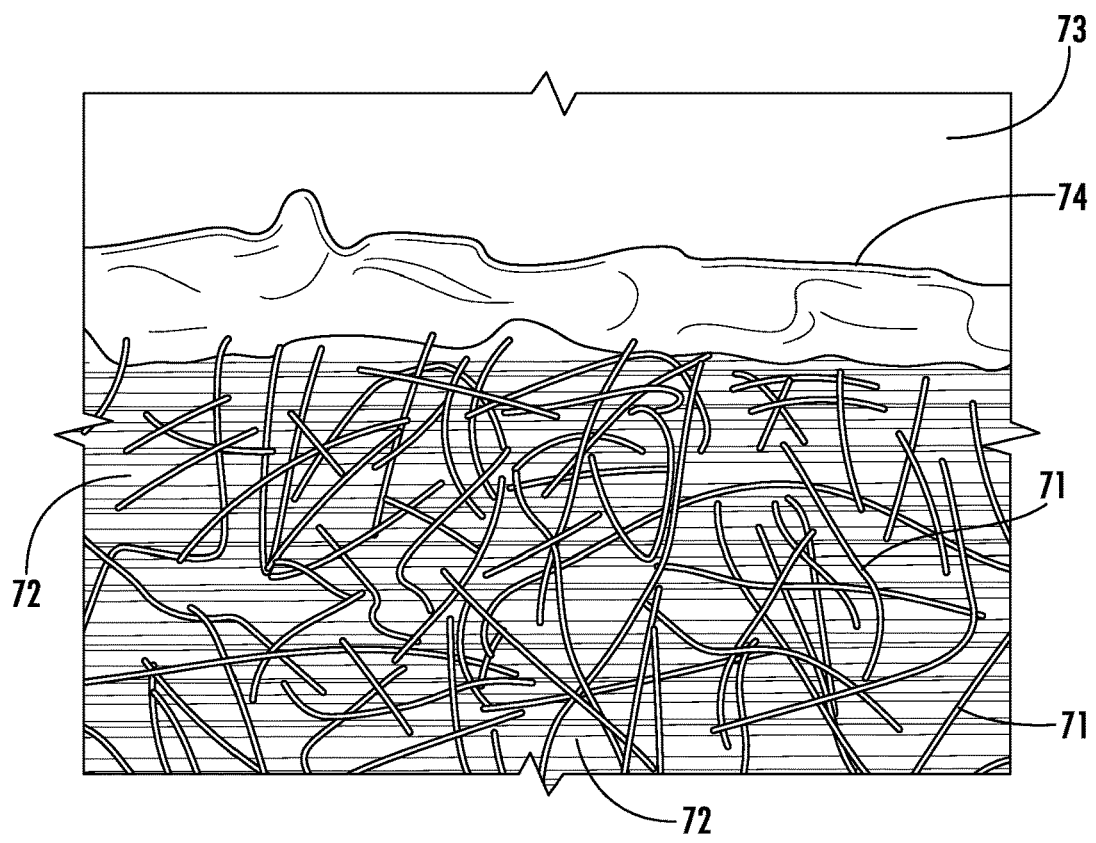
FIG. 7B is a 100× magnification of a test plaque showing the edge of the test plaque, along with the bulk material and stainless-steel fibers.

Likewise, FIG. 7A and 7B are images of a 100× magnification of the test plaque 70 constructed from a bulk polymer 72 with fibers 71 fabricated from austenitic stainless steel 27, which were plated with lead-tin. At 30% by weight of the total electrically conductive polymer 12, the fibers 71 are properly dispersed across the bulk polymer 12, even at the edge 74. FIG. 7B shows the lower left corner 57 of a test plaque 50, with the plaque 70 magnified 100× and the air 73. This is the type of dispersion that forms a Faraday Cage.

Each test plaque 50 weighed, on average, about 3 ounces or 85 grams. Each test plaque 50 contained over 14,500,000 fibers with an aggregate fiber length of 12.86 miles or 20.75 km. There were over 3.4 million fibers per cubic inch or 210,000 fibers per cubic cm. The test plaques 50 were fabricated from electrically conductive polymer pellets. Each pellet had 12,000 fibers. Each ounce of resin requires 405 pellets.

Figure 8:
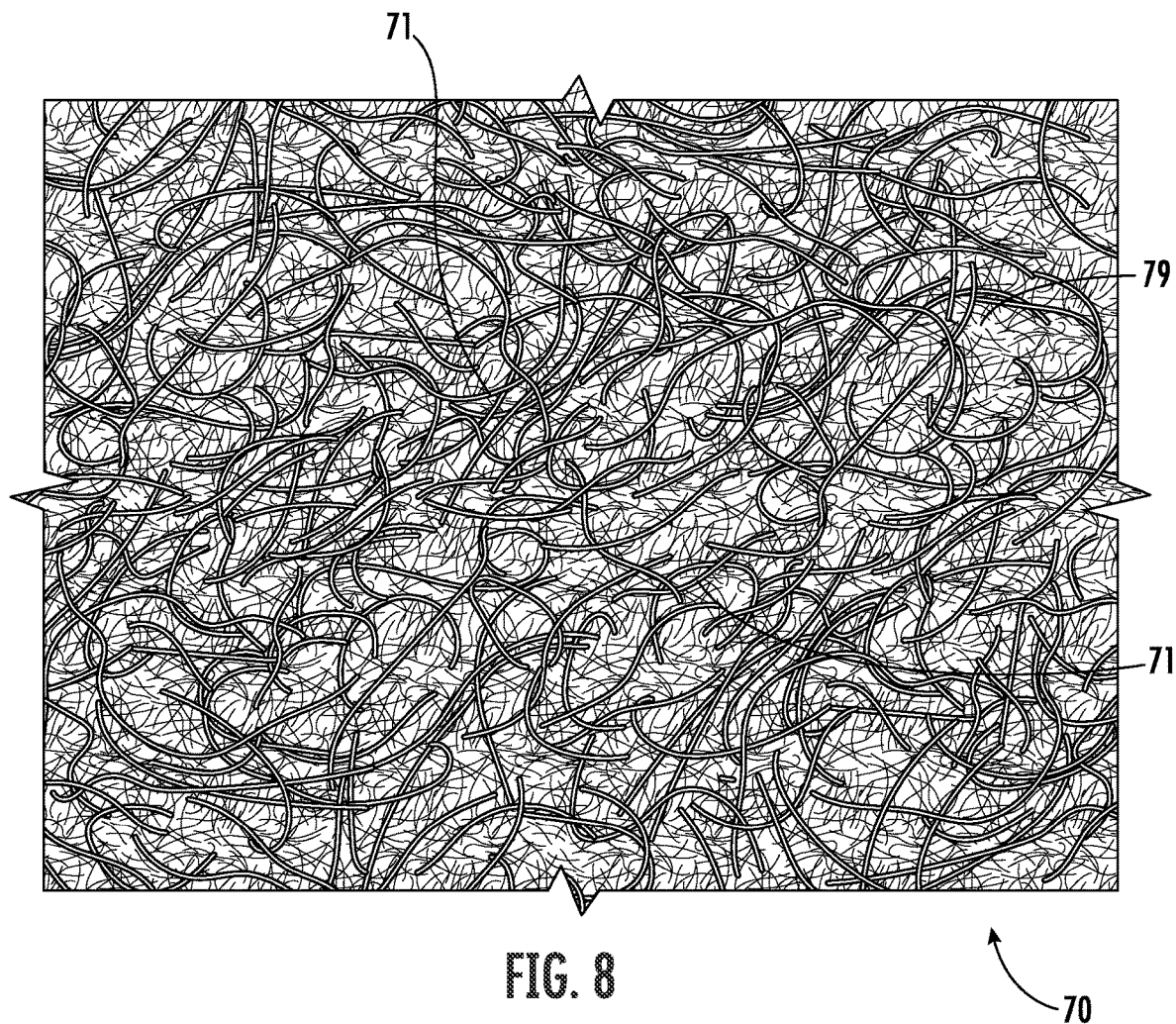
FIG. 8 is a 40× magnification of a test plaque showing the bulk material and stainless-steel fibers after a destructive ash test.

The test plaques 70 were run through demanding environmental testing, including an Ash test which charred the bulk polymer 72. FIG. 8 is a 40× magnification of a test plaque 70, showing only exterior fiber 71 and interior fiber 79. The fiber 71, 79 are still dispersed, even after the bulk polymer 72 has been charred away.

Figure 9:
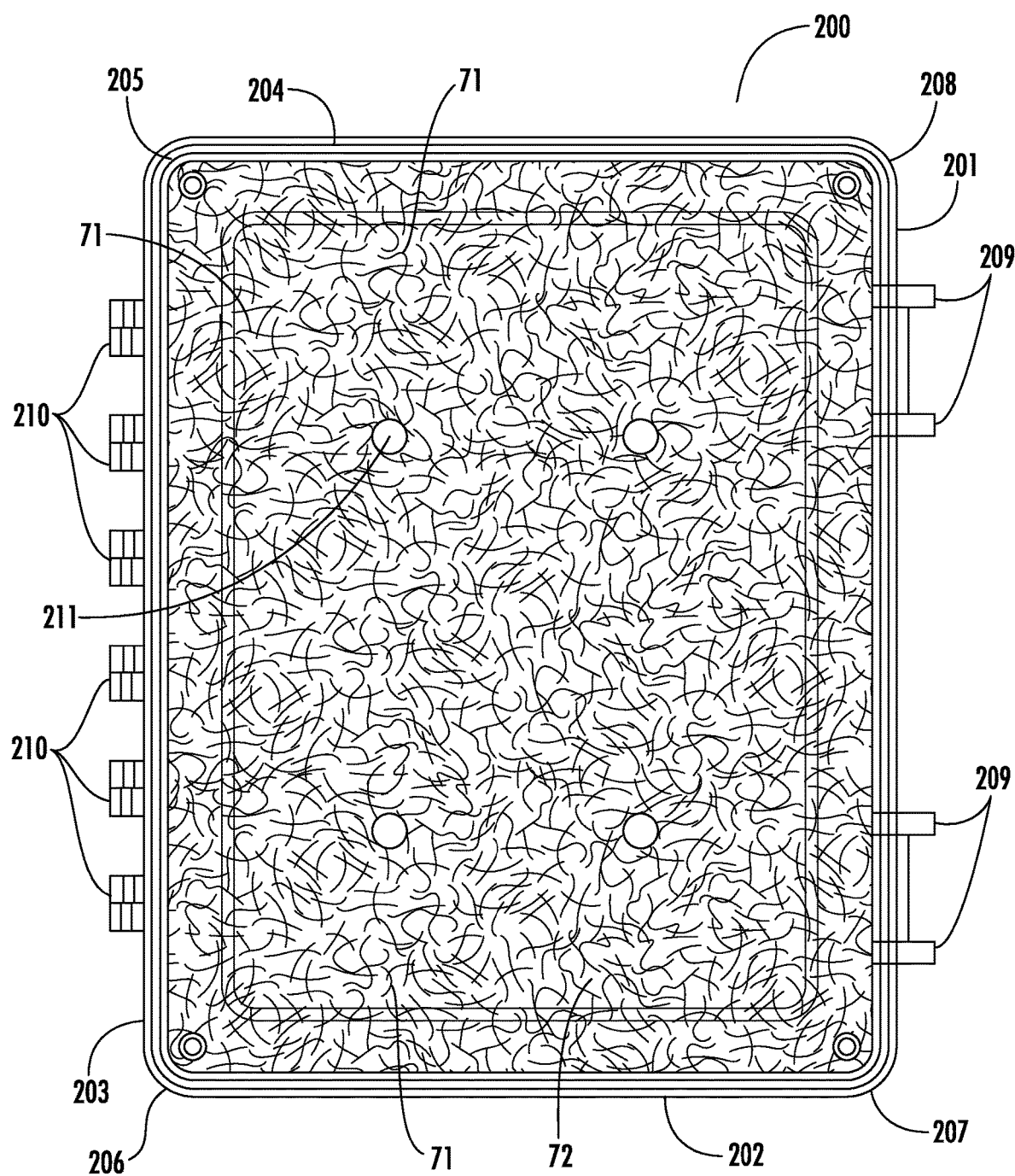
FIG. 9 is an X-ray image of a printed circuit board shielding case fabricated using the present invention.
Figure 11:
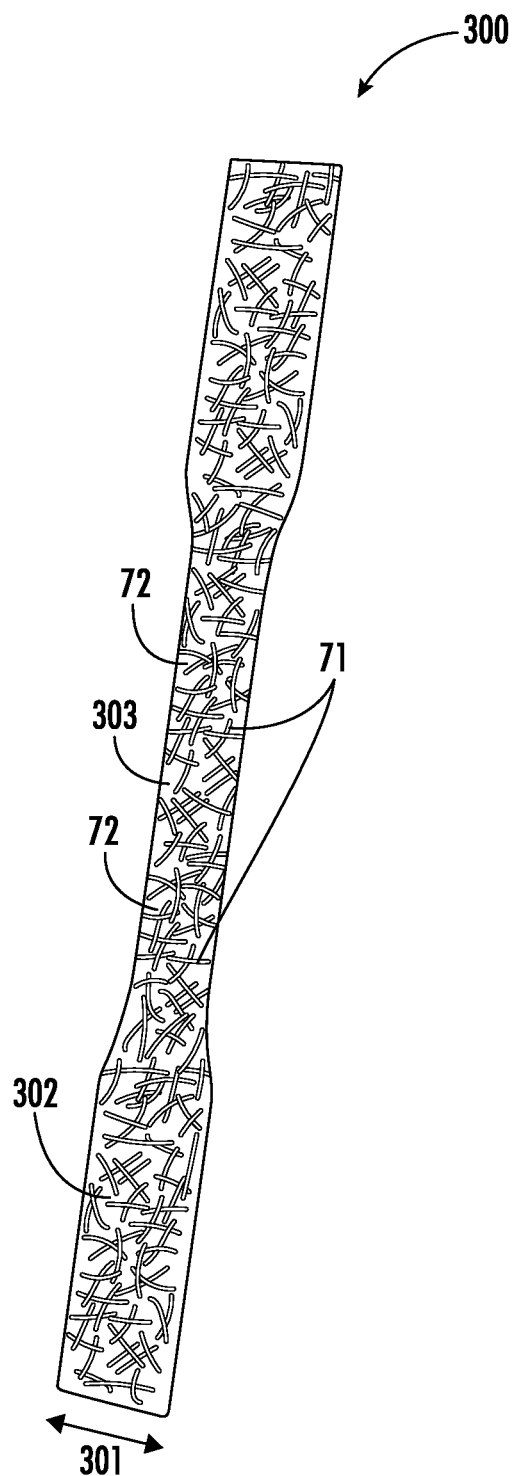
FIG. 11 is an X-ray image of a wire harness shield fabricated using the present invention.

FIGS. 9 and 11 show applications of the present invention. FIG. 9 is a representation of X-ray imaging of an RFID shield 200. An RFID shield 200 is typically used to shield printed circuit boards that generate significant radio frequency electro-magnetic interference. The RFID shield 200 has four sides 201, 202, 203, 204 connected by four filleted corners 205, 206, 207, 208. The RFID shield 200 has a plurality of tabs 209, 210 to secure the RFID shield 200 in place. The RFID shield 200 also has a plurality of holes 211. The image clearly shows that the plurality of fibers 71 fabricated from austenitic stainless steel 27, which were plated with lead-tin, are properly dispersed in a bulk 72 polymer.

FIG. 11 shows an X-ray image of a wire shielding sleeve 300. The wire shielding sleeve 300 isolates particularly susceptible cables from the electro-magnetic environment around it. The wire shielding sleeve 300 has two tabbed ends 302 and a narrower cylindrical area 303. There is an opening along the width 301 of the tabbed ends 302. The X-ray image shows that the plurality of fibers 71 fabricated from austenitic stainless steel 27, which were plated with lead-tin, are properly dispersed in a bulk 72 polymer.

The electrical conductivity of the present invention 12 can be enhanced by an inductive heat-treatment. Although conventional heat would tend to melt the bulk polymer 10, a large induced field would send high current through the coated stainless-steel fibers 11, 100. If properly controlled, this induction can melt the tin, tin-lead, tin-silver, tin-palladium, tin-silver-palladium, or silver-palladium coating 11, creating an impervious solder bond. This is only possible due to the relatively low melting point of tin and its eutectics.

We claim:

1. An electrically conductive polymer comprised of
a bulk polymer; and
a plurality of coated stainless-steel fibers;
  wherein the stainless-steel fibers have an outermost coating that is one of tin, tin-lead, tin-silver, tin-palladium, tin-silver-palladium, and silver-palladium;
  wherein the outermost coating is between 5% and 40%, by weight, of the coated stainless-steel fiber; and
  wherein the coated stainless-steel fibers make up between 25% and 35%, by weight, of the electrically conductive polymer.

2. The electrically conductive polymer of claim 1, wherein austenitic stainless-steel fibers are used.

3. The electrically conductive polymer of claim 1, wherein martensitic stainless-steel fibers are used.

4. The electrically conductive polymer of claim 1, wherein precipitation hardened stainless-steel fibers are used.

5. The electrically conductive polymer of claim 1, wherein duplex stainless-steel fibers are used.

6. The electrically conductive polymer of claim 1, where ferritic stainless-steel fibers are used.

7. The electrically conductive polymer of claim 1, wherein the bulk polymer is one of polypropylene ("PP"), polycarbonate ("PC"), acrylonitrile butadiene styrene ("ABS"), polyethylene ("PE"), polyether ether ketone ("PEEK"), and polyethylene terephthalate ("PET").

8. The electrically conductive polymer of claim 1, wherein the stainless-steel fibers have an inner coating.

9. The electrically conductive polymer of claim 8, wherein the inner coating is nickel.

10. The electrically conductive polymer of claim 9, wherein the inner coating of nickel is over-coated with copper.

11. The electrically conductive polymer of claim 8, wherein the inner coating is copper.

12. The electrically conductive polymer of claim 11, wherein the inner coating of copper is over-coated with nickel.

13. The electrically conductive polymer of claim 1, wherein the electrically conductive polymer has over 3.4 million coated stainless-steel fibers per cubic inch.

14. The electrically conductive polymer of claim 1, wherein the outermost coating is inductively heated in order to create solder bonds between the coated stainless-steel fibers.

* * * * *